US011455173B2

(12) United States Patent
Yuan et al.

(10) Patent No.: US 11,455,173 B2
(45) Date of Patent: Sep. 27, 2022

(54) MANAGEMENT OF ARTIFICIAL INTELLIGENCE DEVELOPMENT PLATFORM

(71) Applicant: Beijing Baidu Netcom Science and Technology Co., Ltd., Beijing (CN)

(72) Inventors: Zhengxiong Yuan, Beijing (CN); En Shi, Beijing (CN); Yongkang Xie, Beijing (CN); Mingren Hu, Beijing (CN); Zhengyu Qian, Beijing (CN); Zhenfang Chu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/207,268

(22) Filed: Mar. 19, 2021

(65) Prior Publication Data
US 2021/0211361 A1 Jul. 8, 2021

(30) Foreign Application Priority Data
Jun. 30, 2020 (CN) .......................... 202010624194.8

(51) Int. Cl.
G06F 9/445 (2018.01)
G06K 9/62 (2022.01)
H04L 41/0803 (2022.01)
H04L 41/0873 (2022.01)
H04L 41/16 (2022.01)
(Continued)

(52) U.S. Cl.
CPC ............ G06F 9/44505 (2013.01); G06F 8/10 (2013.01); G06F 8/30 (2013.01); G06F 9/45558 (2013.01); G06F 9/5027 (2013.01); G06K 9/6256 (2013.01); H04L 41/0803 (2013.01); H04L 41/0873 (2013.01); H04L 41/16 (2013.01);
(Continued)

(58) Field of Classification Search
CPC .. G06F 9/44505; G06F 9/5005; G06F 9/5077; G06F 9/45558; G06F 9/5027; G06F 8/10; G06F 8/71; G06F 8/30; G06F 17/16; G06F 17/15; G06N 3/08; G06N 3/0445; G06N 20/10; H04L 51/02
See application file for complete search history.

(56) References Cited

U.S. PATENT DOCUMENTS

| 2019/0102206 A1* | 4/2019 | Fichtenholtz | ....... G06F 9/44505 |
| 2019/0156244 A1 | 5/2019 | Faulhaber, Jr. et al. | |
| 2021/0064361 A1* | 3/2021 | Jayaraman | ................ G06F 8/10 |

FOREIGN PATENT DOCUMENTS

KR 20190076212 A 7/2019

OTHER PUBLICATIONS

Search Report and Opinion in counterpart European application EP 21163519.8, dated Apr. 16, 2021.

* cited by examiner

Primary Examiner — Kyung H Shin
(74) Attorney, Agent, or Firm — Leydig, Voit & Mayer, Ltd.

(57) ABSTRACT

A method for management of an artificial intelligence development platform is provided. The artificial intelligence development platform is deployed with instances of a plurality of model services, and each of the model services is provided with one or more instances. The method includes: acquiring calling information of at least one model service; determining the activity of the at least one model service according to the calling information; and at least deleting all instances of the at least one model service in response to that the determined activity meets a first condition.

20 Claims, 2 Drawing Sheets

(51) Int. Cl.
*H04L 67/2895* (2022.01)
*G06F 8/30* (2018.01)
*H04L 51/02* (2022.01)
*G06F 8/10* (2018.01)
*G06F 9/455* (2018.01)
*G06F 9/50* (2006.01)

(52) U.S. Cl.
CPC .......... *H04L 51/02* (2013.01); *H04L 67/2895* (2013.01); *G06F 9/5005* (2013.01)

MANAGEMENT OF ARTIFICIAL INTELLIGENCE DEVELOPMENT PLATFORM

CROSS REFERENCE TO RELATED APPLICATIONS

This application claims priority to Chinese Patent Application No. 202010624194.8, filed on Jun. 30, 2020, the contents of which are hereby incorporated by reference in their entirety for all purposes.

TECHNICAL FIELD

The present disclosure relates to the technical field of artificial intelligence and in particular to a method for management of an artificial intelligence development platform, a computing system, and a non-transitory computer readable storage.

BACKGROUND

With the landing of an application of an artificial intelligence (AI for short) technology in various industries, a company with AI technical capacity provides automatic deployment and service solutions for a user customization model by virtue of an AI development platform. Massive AI model services present challenges to model deployment and online reasoning of the AI development platform.

SUMMARY

According to one aspect of the present disclosure, provided is a method for management of an artificial intelligence development platform. The artificial intelligence development platform is deployed with instances of a plurality of model services, and each of the plurality of model services is provided with one or more instances. The method includes: acquiring calling information of at least one model service; determining activity of the at least one model service according to the calling information; and deleting all instances of the at least one model service in response to the determined activity meets a first condition.

According to another aspect of the present disclosure, further provided is a computing system for management of an artificial intelligence development platform. The artificial intelligence development platform is deployed with instances of a plurality of model services, and each of the plurality of model services is provided with one or more instances. The computing system including: one or more processors; and a non-transitory memory that stores a program, the program including instructions that, when executed by the one or more processors, cause the one or more processors to: acquire calling information of at least one model service; determine activity of the at least one model service according to the calling information; and delete all instances of the at least one model service in response to the determined activity meets a first condition.

According to another aspect of the present disclosure, further provided is a non-transitory computer readable storage medium for management of an artificial intelligence development platform storing one or more programs. The artificial intelligence development platform is deployed with instances of a plurality of model services, and each of the plurality of model services is provided with one or more instances. The one or more program including instructions, which, when executed by one or more processors of a computing system, cause the computing system to acquire calling information of at least one model service; determine activity of the at least one model service according to the calling information; and delete all instances of the at least one model service in response to the determined activity meets a first condition.

BRIEF DESCRIPTION OF THE DRAWINGS

The accompanying drawings exemplarily show embodiments, constitute one part of the description and serve to explain exemplary implementation ways of the embodiments together with text description of the description. The shown embodiments are merely for the purpose of illustration, but are not intended to limit the scope of claims. In all the accompanying drawings, same numerals in the accompanying drawings indicate similar, but not necessarily identical, elements.

DETAILED DESCRIPTION OF THE EMBODIMENTS

Figure 1:
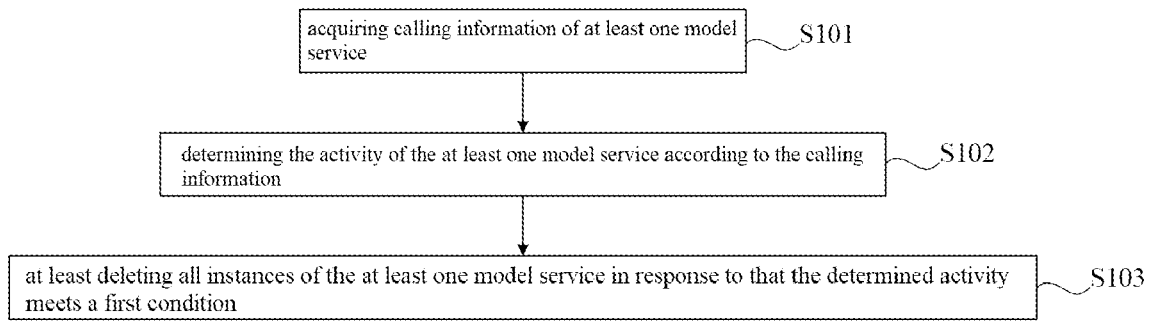
FIG. 1 is a flow diagram showing a method for management of an artificial intelligence development platform according to an exemplary embodiment.

In the present disclosure, terms such as "first" and "second" for describing various elements are merely intended to distinguish one of the elements from other elements, rather than to limit a positional, sequential or importance relationship among these elements unless otherwise noted. In some examples, a first element and a second element may refer to the same instance of the element, but they may also indicate different instances based on the contextual description in some cases.

Terms used in the description of various examples in the present disclosure are merely for the purpose of description, instead of limitation, of specific examples. If the number of the elements is not specifically limited, one or more of the elements may be provided, unless it is specifically noted in the context. In addition, the term "and/or" used in the present disclosure covers any one or all possible combination ways of listed items.

For an AI development platform, a network structure of an AI model, particularly, a deep learning model, is extremely complex, and a greater internal memory space (a GB level) is required for deploying instances of a single model service. The AI development platform needs to support tens of thousands of model services and provide massive internal memory resources so as to be very high in machine cost, and there is a situation that a great number of model services are not called for a long time, and therefore, the utilization ratio of the resources is relatively low. In addition, due to the access of a great number of services, burden is brought for an access layer of the AI development platform. For example, massive traffic routing rule configuration and frequent routing rule change are prone to cause performance problems of the access layer, thereby lowering the overall performance of an online reasoning service.

In the related art, for solving the above-mentioned problems caused by massive AI model services, mainly provided are two solutions described as follows:

Firstly, a single large cluster is split into a plurality of medium-scale clusters based on a multi-cluster solution, and a hierarchical routing rule is formulated to relieve a routing load of the single cluster; and Secondly, the number of instances of the services is automatically adjusted according to a traffic characteristic based on a serverless solution.

However, for the first solution, the problem that massive models occupy the internal memory resources is not fundamentally solved, and a great number of machine resources are still required for capacity expansion. In addition, the problem of cooperation among the clusters may also be brought, a network topology is complex, and state asynchronism among the plurality of clusters is easily caused by a network problem. For the second solution, instances of any model services are not deployed on the AI development platform, the number of the instances of the services is automatically adjusted according to the traffic characteristic, the time consumed for the initialization of the AI model services is relatively long, and the time consumed for the initialization of a complex model may be up to a minute level. Therefore, by using the serverless solution in which a traffic is kept and a transmitted automatic wakeup mechanism is incapable of taking effects, an online reasoning request is easy to be overtime. In the serverless solution, a service grid framework is also required to be introduced, and a migration process of inventory services is relatively cumbersome, so that the reconstruction cost of the platform is increased. Therefore, it is desired to provide an effective technology for solving the above-mentioned problems caused by the AI model services.

Based on the above, the present disclosure provides a method for management of an artificial intelligence development platform. Calling information of a model service is acquired, and the activity of the model service is determined based on the calling information. A policy rule may be set, all instances deployed on the development platform by the model service are deleted in response to determining that the activity of the model service meets a first condition, and resources such as central processing unit (CPU) and an internal memory of a machine are released, so that the utilization ratio of the resources may be increased, and requirements for machine resources of the AI development platform may be reduced. In addition, since the instances of the model service are deleted based on the calling activity of the model service, the problem that a serverless automatic wakeup mechanism easily results in the overtime of the online reasoning request may be solved, and the service grid framework is not required to be introduced, so that the reconstruction cost of the AI development platform is very low.

In the present disclosure, online reasoning is performed by one instance of the model service in response to that a model reasoning traffic of the model service is received. The calling information of the model service is actually calling information of all instances of the model service.

The method for management of an artificial intelligence development platform in the present disclosure will be further described below in conjunction with the accompanying drawings.

The AI development platform provides automatic deployment and a service solution for a user. The AI development platform may be deployed with instances of a plurality of model services. The instances of the model services are capable of performing online reasoning in response to that the model reasoning traffic of the model services are received so as to achieve certain functions such as image classification, object detection, text recognition, speech recognition and natural language processing. Each model service may be provided with one or more instances, each instance is a copy of the model service, and the one or more instances perform online reasoning so as to be capable of achieving the same function. Users may select the deployment number of the instances of the model services according to respective actual demands.

It should be noted that all the model services in the present disclosure refer to models of which the instances are deployed on the AI development platform by users and are capable of achieving certain functions, unless it is particularly noted. A user may call instances of model services deployed on the AI development platform by himself, or call instances of model services deployed on the AI development platform by other users.

FIG. 1 is a flow diagram showing a method for management of an artificial intelligence development platform according to an exemplary embodiment of the present disclosure. As shown in FIG. 1, the method may include: step S101, calling information of at least one model service is acquired; step S102, the activity of the at least one model service is determined according to the calling information; and step S103, all instances of the at least one model service are deleted at least in response to that the determined activity meets a first condition. Therefore, the utilization ratio of machine resources may be increased.

According to some embodiments, activities of all inventory model services deployed on the AI development platform may be determined, and all the instances of the at least one model service of which the activity meets the first condition are deleted.

The calling information may include, for example, the creation time of the model services and at least one of the following information: last calling time, calling frequency within a predetermined time window and calling time distribution within the predetermined time window. Therefore, the activities (that is, calling activities) of the model services may be determined based on the calling information.

According to some embodiments, the activities of the model services may be, but are not limited to be divided into two levels: active and lowly active. In this case, all the instances of the at least one model service may be deleted at least in response to that the determined activity is on the lowly active level.

In some exemplary embodiments, if it is determined that the model services are stably called recently based on the calling information of the model services, it may be determined that the model services do not meet the first condition, the instances of the model services are not deleted, and thus, the timeliness of the online reasoning requests of the model services may be guaranteed. If it is determined that the model services are not called recently, but may be stably called on a long-time scale (for example, a time scale from the creation time of the model services to the current time), it may be determined that the model services meet the first condition, and all the instances of the model services are deleted.

According to some embodiments, for at least one model service of which the instances have been deleted, routing configuration of the at least one model service in the access layer of the platform is deleted in response to determining that the at least one model service of which the instances have been deleted is not called within a predetermined period. That is, for the model service of which the instances have been deleted, it is further judged whether the model service of which the instances have been deleted is not called within a preset time window, if yes, a routing rule corresponding to the model service of which the instances have been deleted is further deleted. Therefore, burden caused on the access layer of the platform by the traffic routing rule configuration and frequent routing rule change may be relieved, and the performance of the online reasoning service may be improved.

In the above-mentioned policy rule, it is determined whether the model services are called recently and stably called based on the calling information, and therefore, the model services are divided into active services and lowly active services. All the instances of the model service are deleted in response to determining that the activity of the model service is on the lowly active level (that is, the first condition is met). Then, it is determined whether the model service of which the instances have been deleted is called within the preset time window, if the model service is not called, the routing rule corresponding to the model service of which the instances have been deleted is continued to be deleted. Therefore, performance loss brought for business services by excessive routing rules may be reduced while the utilization ratio of the resources is increased.

It may be understood that a first condition different from the above-mentioned first condition may also be set according to other policy rules, and all the instances of the model services are deleted at least in response to determining that the activities of the service models meet the set first condition. For example, the model services may also be divided into active services, lowly active services and inactive services based on the calling information. Instances of the model service are not deleted in response to determining that the activity of the model service is on the active level; all instances of the model service may only be deleted in response to determining that the activity of the model service is on the lowly active level; and all instances and a routing rule of the model service are deleted in response to determining that the activity of the model service is on the inactive level. That is, the first condition may include different sub-conditions, and all the instances of the model services are deleted at least according to the different sub-conditions. In the exemplary embodiment, the active services may be, for example, services which may be stably called on a time scale from the creation time of the model services to the current time; the lowly active services may be, for example, services which are not called recently and may be stably called within a relatively long-time window; and the inactive services may be, for example, services which are not called within the relatively long-time window.

Figure 2:
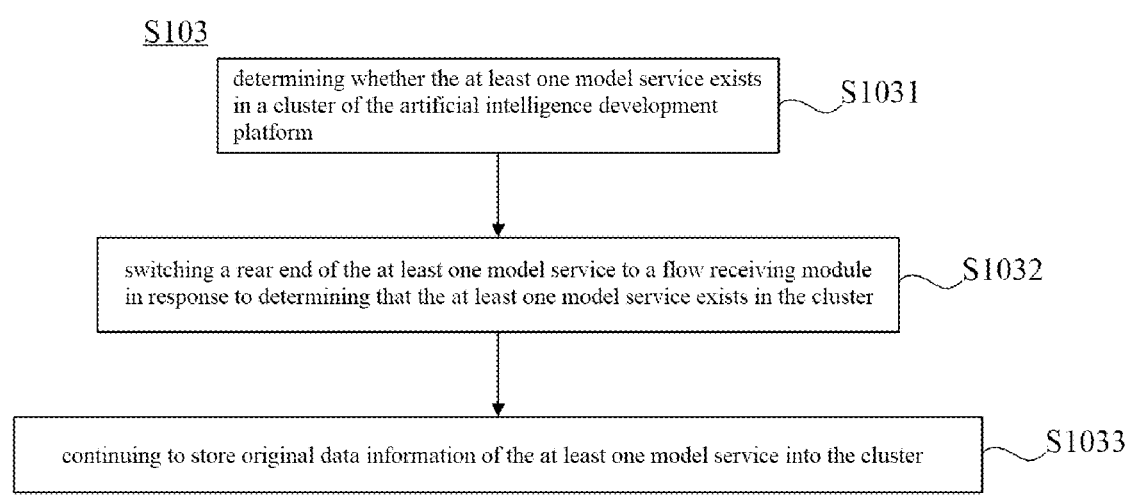
FIG. 2 is a flow diagram showing at least deletion of all instances of a model service according to an exemplary embodiment.

According to some embodiments, as shown in FIG. 2, the step S103 in which all the instances of the at least one model service are deleted at least may include: step S1031, it is determined whether the at least one model service exists in a cluster of the artificial intelligence development platform system; and step S1032, a backend of the at least one model service is switched to a traffic receiving module (e.g., a traffic receiving processor) in response to determining that the at least one model service exists in the cluster, wherein the traffic receiving module is used for receiving a model reasoning traffic for the model service of which the instances have been deleted. Therefore, all the instances (that is, all copies) deployed on the AI development platform by the model services may be only deleted at least, but the model services are not deleted, so that the deployment of the instances of the model services may be subsequently recovered.

After a user creates the model services on the AI development platform, the model services may be stored in a special storage system (such as a cloud storage system), and a certain number of instances may be deployed according to demands of users so as to be used for performing online reasoning.

According to some embodiments, the step S103 may further include: step S1033, original data information of the at least one model service is continued to be stored into the cluster, wherein the original data information at least includes a first number of the instances deployed on the development platform before the instances of the at least one model service is deleted. Therefore, all the instances of the model service may be recovered when the model service of which the instances have been deleted is called, so that online reasoning demands of the users are not affected.

The original data information may further include, for example, computing resources (such as a category and type of a processor) required by the model service of which the instances have been deleted, so that the online reasoning performance of the model service may be guaranteed after all the deleted instances of the model service are recovered.

The AI development platform may be, but is not limited to the single cluster. Therefore, it may be ensured that the original data information of the model service exists and may be continued to be stored in the cluster after the instances of the model service are deleted, so that the deployment of the instances of the model service may be subsequently recovered.

In the case that the AI development platform is the single cluster, the backend of the model service of which the instances have been deleted may be directly switched to the traffic receiving module in response to that all the instances of the model service are deleted, wherein the traffic receiving module is used for receiving the model reasoning traffic for the model service of which the instances have been deleted.

Figure 3:
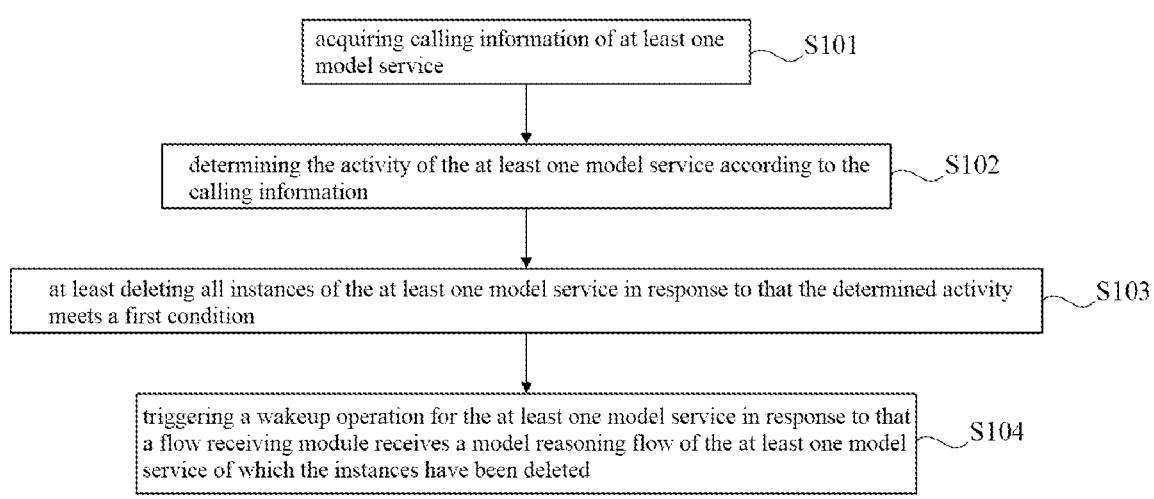
FIG. 3 is a flow diagram showing a method for management of an artificial intelligence development platform according to an exemplary embodiment.

According to some embodiments, as shown in FIG. 3, the method may further include: step S104, a wakeup operation for the at least one model service is triggered in response to that the traffic receiving module receives the model reasoning traffic of the at least one model service of which the instances have been deleted. The wakeup operation may include: the first number of instances of the at least one model service is recovered on the AI development platform, and states of the recovered instances are polled until the starting of the first number of instances is completed; and the backend of the at least one model service is switched back to the first number of recovered instances. Therefore, when a user calls the model service of which the instances have been deleted, all the instances of the model service are recovered on the AI development platform, and online reasoning is performed. In addition, the backend of the model service is switched back to the instances of the model service after all the deleted instances of the model service are recovered, so that the model service may be subsequently called, and the problem that the online reasoning request of the model service is delayed is avoided.

In the case that the routing configuration of the at least one model service in the access layer of the platform has been deleted, the wakeup operation further includes: a routing rule corresponding to the at least one model service is reconfigured. Therefore, when the access layer receives the model reasoning traffic of the at least one model service of which the instances have been recovered, connection between a user side and each of the instances of the model service may be established according to the routing rule.

In an exemplary embodiment, the traffic receiving module may be provided with a plurality of instances, wherein when a first instance in the plurality of instances of the traffic receiving module firstly receives the model reasoning traffic of the at least one model service of which the instances have been deleted, the first instance acquires a distributed lock resource and triggers the wakeup operation, wherein the first instance possesses may be capable of preventing other instances in the plurality of instances of the traffic receiving module from triggering the wakeup operation when the first instance possesses the distributed lock resource. Therefore, due to the arrangement of the distributed lock resource, the model service of which the instances have been deleted may be prevented from being repeatedly awakened, and the machine resources may be prevented from being unnecessarily occupied.

According to the technical solution of the present disclosure, the calling activity of the model service may be determined based on the calling information of the model service, and by setting the policy rule, all the instances of the model service may be deleted at least in response to that the activity of the model service meets the preset first condition, so that the utilization ratio of the machine resources may be increased, requirements for the machine resources of the platform may be reduced, and the online reasoning performance may be further improved.

It has been given by the above-mentioned content that the calling information capable of representing the activity that the model service is called may include the creation time of the model service and at least one of the following information of the model service: the last calling time, the calling frequency within the predetermined time window and the calling time distribution within the predetermined time window. Therefore, the calling activity of the model service may be determined based on the calling information.

In other words, the step S101 in which the calling information of the at least one model service is acquired may include: the creation time of the at least one model service is acquired; and at least one of the following information of the at least one model service is acquired: the last calling time, the calling frequency within the predetermined time window and the calling time distribution within the predetermined time window.

According to some embodiments, at least one of the following information: last calling time, calling frequency within a predetermined time window and calling time distribution within the predetermined time window, of the at least one model service may be acquired by analyzing traffic logs related to all the instances of the at least one model service. For example, the traffic logs related to all the instances of the at least one model service may be acquired by the access layer of the platform, and the above-mentioned information of the at least one model service may be acquired by analyzing the traffic logs. The acquisition of the traffic logs related to all the instances of the at least one model service may be executed at a fixed time, for example, the traffic logs related to all the instances of the at least one model service in a previous day are acquired in the same day. The traffic logs of all the instances in the access layer of the platform may be gathered, and each reasoning traffic request in the logs may be analyzed to acquire the calling information of each model service. The calling information of all the instances of all the inventory model services on the AI development platform may be acquired by virtue of the traffic logs in the access layer of the platform, so that the calling information of each inventory model service may be acquired by analyzing the traffic logs, and the calling activity of each inventory model service may be determined based on the calling information.

Figure 4:
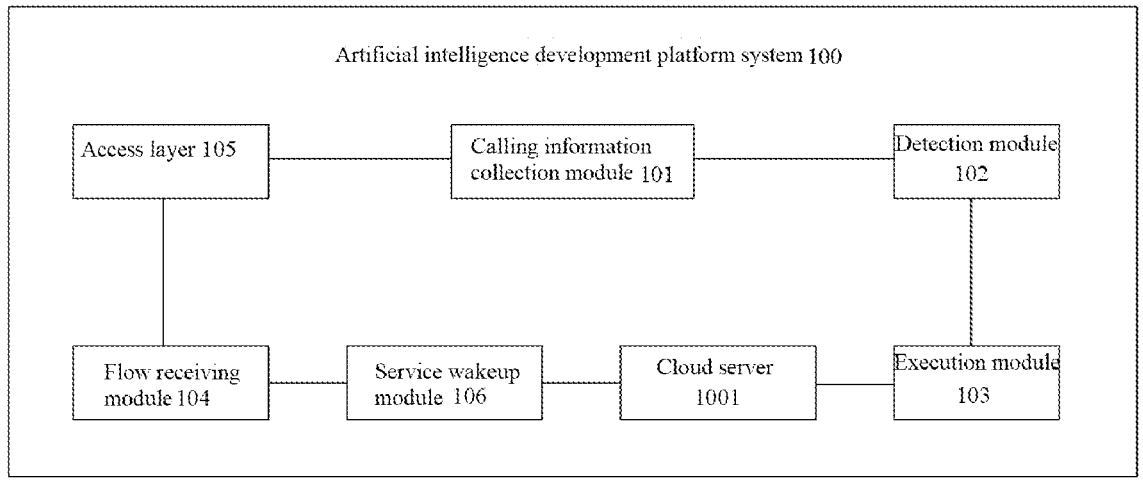
FIG. 4 is a schematic block diagram showing a structure of an artificial intelligence development platform system according to an exemplary embodiment.

According to another aspect of the present disclosure, further provided is an artificial intelligence development platform system. As shown in FIG. 4, the artificial intelligence development platform system 100 may include a cloud server 1001, configured to be deployed with instances of a plurality of model services, wherein each of the model services is provided with one or more instances; a calling information collection module 101 (e.g., calling information collection processor), configured to acquire calling information of at least one model service; a detection module 102 (e.g., detection processor), configured to determine the activity of the at least one model service according to the calling information; and an execution module 103 (e.g., execution processor), configured to at least delete all instances of the at least one model service in response to that the determined activity meets a first condition. Therefore, the utilization ratio of machine resources may be increased.

According to some embodiments, the calling information collection module may be configured to acquire the creation time of the at least one model service and acquire at least one of the following information: last calling time, calling frequency within a predetermined time window and calling time distribution within the predetermined time window, of the at least one model service by analyzing traffic logs related to all the instances of the at least one model service. It may be understood that the calling information may further include other information as long as the calling activity of the at least one model service may be represented, the limitations thereof are omitted herein.

According to some embodiments, the execution module 103 may be further configured to delete routing configuration of the at least one model service in an access layer 105 of a platform in response to determining that the at least one model service of which the instances have been deleted is not called within a predetermined period. Therefore, burden caused on the access layer of the platform by the traffic routing rule configuration and frequent routing rule change may be relieved, and the performance of an online reasoning service may be improved.

According to some embodiments, the artificial intelligence development platform system 100 may further include a traffic receiving module 104 (e.g., traffic receiving processor), wherein in response to that the determined activity meets the first condition, the execution module 103 may be further configured to: determine whether the at least one model service exists in a cluster of the artificial intelligence development platform system; and switch a backend of the at least one model service to the traffic receiving module 104 in response to determining that the at least one model service exists in the cluster, wherein the traffic receiving module 104 is used for receiving a model reasoning traffic for the model service of which the instances have been deleted.

According to some embodiments, the execution module 103 may be further configured to: continue to store original data information of the at least one model service into the cluster, wherein the original data information at least includes a first number of the instances deployed on the cloud server 1001 before the instances of the at least one model service is deleted. Therefore, all the instances of the model service may be recovered when the model service of which the instances have been deleted is called, so that online reasoning demands of users are not affected.

The artificial intelligence development platform system may be, but is not limited to a single cluster. Therefore, it may be ensured that the original data information of the model service exists and may be continued to be stored in the cluster after the instances of the model service are deleted, so that the deployment of the instances of the model service may be subsequently recovered.

According to some embodiments, the artificial intelligence development platform system 100 may further include a service wakeup module 106 (e.g., service wakeup processor), wherein the service wakeup module 106 may be configured to: in response to that the traffic receiving module 104 receives the model reasoning traffic of the at least one model service of which the instances have been deleted, recover the first number of instances of the at least one model service on the cloud server 1001, and poll states of the recovered instances until the starting of the first number of instances is completed; and switch the backend of the at least one model service back to the first number of recovered instances. Therefore, when a user calls the model service of which the instances have been deleted, all the instances of the model service are recovered on the cloud server of the AI development platform system, and online reasoning is performed. In addition, the backend of the model service is switched back to the instances of the model service after all the deleted instances of the model service are recovered, so that the model service may be subsequently called, and the problem that the online reasoning request of the model service is delayed is avoided.

In the case that the routing configuration of the at least one model service in the access layer of the platform has been deleted, the service wakeup module 106 may be further configured to: reconfigure a routing rule corresponding to the at least one model service. Therefore, when the access layer receives the model reasoning traffic of the at least one model service, connection between a user side and each of the instances of the model service may be established according to the routing rule.

In an exemplary embodiment, the traffic receiving module 104 may be provided with a plurality of instances, wherein when a first instance in the plurality of instances of the traffic receiving module 104 firstly receives the model reasoning traffic of the at least one model service of which the instances have been deleted, the first instance acquires a distributed lock resource and triggers the wakeup operation, wherein the first instance possesses may be capable of preventing other instances in the plurality of instances of the traffic receiving module from triggering the wakeup operation when the first instance possesses the distributed lock resource. Therefore, due to the arrangement of the distributed lock resource, the model service of which the instances have been deleted may be prevented from being repeatedly awakened, and the machine resources may be prevented from being unnecessarily occupied.

According to further aspect of the present disclosure, further provided is an electronic device, including a processor; and a memory for storing a program, wherein the program includes an instruction, and the processor is enabled to execute the above-mentioned method when the instruction is executed by the processor.

According to yet further aspect of the present disclosure, further provided is a computer readable storage medium for storing a program, wherein the program includes an instruction, and the electronic device is enabled to execute the above-mentioned method when the instruction is executed by the processor of the electronic device.

Figure 5:
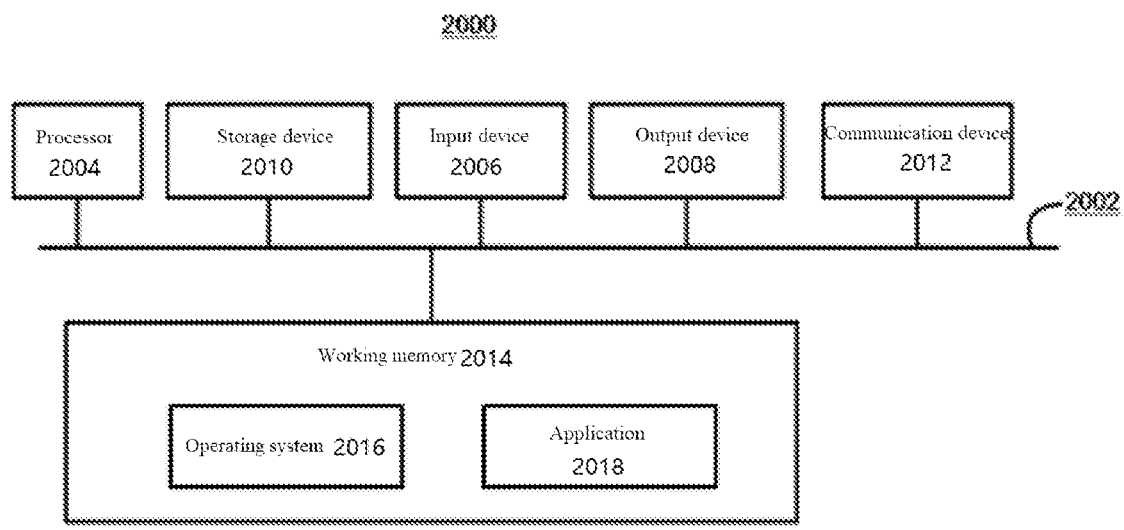
FIG. 5 is a structural block diagram showing an exemplary computing device which may be applied to an exemplary embodiment.

As shown in FIG. 5, a computing device 2000 serving as an example of a hardware device (an electronic device) which may be applied to various aspects of the present disclosure will be described from now on. The computing device 2000 may be any machine configured to perform processing and/or computing, may be, but is not limited to a workstation, a server, a desk computer, a laptop computer, a tablet computer, a personal digital assistant, a robot, a smart phone, a vehicle-mounted computer or any combinations thereof. The above-mentioned method may be completely or at least partially implemented by the computing device 2000 or a similar device or system.

The computing device 2000 may include an element which is connected with a bus 2002 or is in communication with the bus 2002 (possibly by one or more interfaces). For example, the computing device 2000 may include the bus 2002, one or more processors 2004, one or more input devices 2006 and one or more output devices 2008. The one or more processors 2004 may be any types of processors and may include, but are not limited to one or more general purpose processors and/or one or more special-purpose processors (such as special processing chips). The input devices 2006 may be any types of devices capable of inputting information to the computing device 2000 and may include, but are not limited to a mouse, a keyboard, a touch screen, a microphone and/or a remote controller. The output devices 2008 may be any types of devices capable of presenting information and may include, but are not limited to a display, a loudspeaker, a video/audio output terminal, a vibrator and/or a printer. The computing device 2000 may further include a non-transitory storage device 2010 or may be connected with the non-transitory storage device 2010, and the non-transitory storage device may be any storage device which is non-transitory and capable of realizing data storage and may include, but is not limited to a disc drive, an optical storage device, a solid-state memory, a floppy disk, a flexible disk, a hard disk, a magnetic tape or any other magnetic medium, an optical disc or any other optical medium, an ROM (Read-Only Memory), an RAM (Random Access Memory), a cache memory and/or any other memory chip or box, and/or any other medium from which a computer may read data, instructions and/or codes. The non-transitory storage device 2010 may be detached from the interfaces. The non-transitory storage device 2010 may have data/programs (including instructions)/codes for implementing the above-mentioned method and steps. The computing device 2000 may further include a communication device 2012. The communication device 2012 may be any type of device or system enabled to be in communication with an external device and/or a network and may include, but is not limited to a modem, a network card, an infrared communication device, a wireless communication device and/or a chipset, such as a Bluetooth™ device, a 1302.11 device, a WiFi device, a WiMax device, a cellular communication device and/or the like.

The computing device 2000 may further include a working memory 2014 which may be any type of working memory capable of storing programs (including instructions) and/or data useful for the work of the processors 2004 and may include, but is not limited to an RAM and/or ROM device.

A software element (program) may be located in the working memory 2014, includes, but is not limited to an operating system 2016, one or more application programs 2018, a driving program and/or other data and codes.

Instructions for executing the above-mentioned method and steps may be included in the one or more application programs 2018, and the above-mentioned method may be implemented by an instruction that the processors 2004 read and execute the one or more application programs 2018. More specifically, in the above-mentioned method, the step S101 to the step S103 may be implemented in a way that, for example, the processors 2004 execute the application programs 2018 with the instructions of the step S101 to the step S103. In addition, other steps in the above-mentioned method may be implemented in a way that, for example, the processors 2004 execute the application programs 2018 with the instructions for executing the corresponding steps. An executable code or source code of an instruction of the software element (program) may be stored in a non-transitory computer readable storage medium (such as the above-mentioned storage device 2010) and may be stored in the working memory 2014 (which is possible to be compiled and/or installed) when being executed. The executable code or source code of the instruction of the software element (program) may also be downloaded from a remote location.

It should be further understood that various variations may be performed according to specific requirements. For example, it is possible to achieve a specific element by using customized hardware and/or hardware, software, firmware, middleware, a microcode, a hardware description language or any combinations thereof. For example, the disclosed method and some or all of the devices may be implemented by programming hardware (such as a programmable logic circuit including an FPGA (Field-Programmable Gate Array) and/or a PLA (Programmable Logic Array)) by using an assembly language or a hardware programming language (such as VERILOG, VHDL and C++) according to a logic and an algorithm of the present disclosure.

It should be further understood that the above-mentioned method may be implemented in a server-client mode. For example, a client may receive data input by a user and transmit the data to a server. The client may also receive the data input by the user to perform partial processing in the above-mentioned method and transmit the data obtained by processing to the server. The server may receive the data from the client, execute the above-mentioned method or the other part in the above-mentioned method and return an execution result to the client. The client may receive the execution result of the method from the server and present the execution result to the user by, for example, an output device.

It should be further understood that components of the computing device 2000 may be distributed on a network. For example, some processing may be executed by using one processor, and meanwhile, other processing may be executed by another processor far away from the processor. Other components of the computing device 2000 may also be similarly distributed. In this way, the computing device 2000 may be explained as a distributed computing system executing processing at a plurality of positions.

Although the embodiments or examples of the present disclosure have been described with reference to the accompanying drawings, it should be understood that the above-mentioned method, system and device are merely exemplary embodiments or examples, the scope of the present disclosure is only limited by authorized claims and equivalent scopes thereof, instead of these embodiments or examples. Various elements in the embodiments or examples may be omitted or replaced with equivalent elements thereof. In addition, all the steps may be performed according to an order different from the order described in the present disclosure. Further, the various elements in the embodiments or examples may be combined in various ways. Importantly, with the evolution of the technology, many elements described herein may be replaced with equivalent elements occurring later than the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for management of an artificial intelligence, AI, development platform, the AI development platform being deployed with instances of a plurality of AI model services, and each of the plurality of AI model services being provided with one or more instances, wherein the method comprises:
   acquiring calling information of all instances of at least one AI model service of the plurality of AI model services;
   determining calling activity of the at least one AI model service according to the calling information; and
   deleting all instances of the at least one AI model service without deleting a routing configuration of the at least one AI model service in an access layer of the AI development platform in response to the determined calling activity meeting a calling frequency within the predetermined time window.

2. The method of claim 1, further comprising:
   in response to determining that the at least one AI model service of which the instances have been deleted is not called within a predetermined period, deleting the routing configuration of the at least one AI model service in the access layer of the AI development platform.

3. The method of claim 1, wherein deleting all instances of the at least one AI model service comprises:
   determining whether the at least one AI model service exists in a cluster of the AI development platform; and
   in response to determining that the at least one AI model service exists in the cluster, switching a backend of the at least one AI model service to a traffic receiving module, wherein the traffic receiving module is used for receiving a model reasoning traffic for the AI model service of which the instances have been deleted.

4. The method of claim 3, wherein deleting all instances of the at least one AI model service further comprises:
   continuing to store original data information of the at least one AI model service into the cluster, wherein the original data information at least comprises a first number of the instances deployed on the AI development platform before the instances of the at least one AI model service is deleted.

5. The method of claim 4, further comprising:
in response to the traffic receiving module receives the model reasoning traffic of the at least one AI model service of which the instances have been deleted, triggering a wakeup operation for the at least one AI model service, wherein the wakeup operation comprises:
recovering the first number of instances of the at least one AI model service on the AI development platform, and polling states of the recovered instances until the starting of the first number of instances is completed; and
switching the backend of the at least one AI model service back to the first number of recovered instances.

6. The method of claim 5, wherein in the case that the routing configuration of the at least one AI model service in the access layer of the AI development platform has been deleted, the wakeup operation further comprises:
reconfiguring a routing rule corresponding to the at least one AI model service.

7. The method of claim 5, wherein the traffic receiving module has a plurality of instances, wherein
when a first instance in the plurality of instances of the traffic receiving module receives the model reasoning traffic of the at least one AI model service of which the instances have been deleted first, the first instance acquires a distributed lock resource and triggers the wakeup operation, wherein the first instance is capable of preventing other instances in the plurality of instances of the traffic receiving module from triggering the wakeup operation when the first instance possesses the distributed lock resource.

8. The method of claim 1, wherein acquiring the calling information of the at least one AI model service comprises:
acquiring the creation time of the at least one AI model service; and
acquiring at least one of the following information of the at least one AI model service by analyzing traffic logs related to all the instances of the at least one AI model service: the most recent calling time, the number of calling within a predetermined time window and calling time distribution within the predetermined time window.

9. The method of claim 1, wherein the AI development platform is a single cluster.

10. A computing system for management of an artificial intelligence, AI, development platform, the AI development platform being deployed with instances of a plurality of AI model services, and each of the plurality of AI model services being provided with one or more instances, wherein the computing system comprises:
one or more processors; and
a non-transitory memory that stores a program, the program comprising instructions that, when executed by the one or more processors, cause the one or more processors to:
acquire calling information of all instances of at least one AI model service of the plurality of AI model services;
determine calling activity of the at least one AI model service according to the calling information; and
delete all instances of the at least one AI model service without deleting a routing configuration of the at least one AI model service in an access layer of the AI development platform in response to the determined calling activity meeting a calling frequency within the predetermined time window.

11. The computing system of claim 10, wherein the instructions further cause the one or more processors to:
in response to determining that the at least one AI model service of which the instances have been deleted is not called within a predetermined period, delete the routing configuration of the at least one AI model service in the access layer of the AI development platform.

12. The computing system of claim 10, wherein deleting all instances of the at least one AI model service comprises:
determining whether the at least one AI model service exists in a cluster of the AI development platform system; and
in response to determining that the at least one AI model service exists in the cluster, switching a backend of the at least one AI model service to a traffic receiving module, wherein the traffic receiving module is used for receiving a model reasoning traffic for the AI model service of which the instances have been deleted.

13. The computing system of claim 12, wherein deleting all instances of the at least one AI model service further comprises:
continuing to store original data information of the at least one AI model service into the cluster, wherein the original data information at least comprises a first number of the instances deployed on the AI development platform before the instances of the at least one AI model service is deleted.

14. The computing system of claim 13, wherein the instructions further cause the one or more processors to:
in response to the traffic receiving module receives the model reasoning traffic of the at least one AI model service of which the instances have been deleted, trigger a wakeup operation for at least one AI model service, wherein the wakeup operation comprises:
recovering the first number of instances of the at least one AI model service on the AI development platform, and poll states of the recovered instances until the starting of the first number of instances is completed; and
switching the backend of the at least one AI model service back to the first number of recovered instances.

15. The computing system of claim 14, wherein in the case that the routing configuration of the at least one AI model service in the access layer of the AI development platform has been deleted, the wakeup operation further comprises:
reconfiguring a routing rule corresponding to the at least one AI model service.

16. The computing system of claim 14, wherein the traffic receiving module has a plurality of instances, wherein
when a first instance in the plurality of instances of the traffic receiving module receives the model reasoning traffic of the at least one AI model service of which the instances have been deleted first, the first instance acquires a distributed lock resource and triggers the wakeup operation, wherein the first instance is capable of preventing other instances in the plurality of instances of the traffic receiving module from triggering the wakeup operation when the first instance possesses the distributed lock resource.

17. The computing system of claim 10, wherein acquiring the calling information of the at least one AI model service comprises:
acquire the creation time of the at least one AI model service; and
acquire at least one of the following information of the at least one AI model service by analyzing traffic logs related to all the instances of the at least one AI model service: the most recent calling time, the number of calling within a predetermined time window and calling time distribution within the predetermined time window.

18. A non-transitory computer readable storage medium for management of an artificial intelligence, AI, development platform storing one or more programs, the AI development platform being deployed with instances of a plurality of AI model services, and each of the plurality AI model services being provided with one or more instances, the one or more program comprising instructions, which, when executed by one or more processors of a computing system, cause the computing system to:
   acquire calling information of all instances of at least one AI model service;
   determine calling activity of the at least one AI model service according to the calling information; and
   delete all instances of the at least one AI model service without deleting a routing configuration of the at least one AI model service in an access layer of the AI development platform in response to the determined calling activity meeting a calling frequency within the predetermined time window.

19. The non-transitory computer readable storage medium according to claim 18, wherein the instructions further cause the one or more processors to:
   in response to determining that the at least one AI model service of which the instances have been deleted is not called within a predetermined period, delete the routing configuration of the at least one AI model service in the access layer of the AI development platform.

20. The non-transitory computer readable storage medium according to claim 18, wherein at least deleting all instances of the at least one AI model service comprises:
   determine whether the at least one AI model service exists in a cluster of the AI development platform system; and
   in response to determining that the at least one AI model service exists in the cluster, switch a backend of the at least one AI model service to a traffic receiving module, wherein the traffic receiving module is used for receiving a model reasoning traffic for the AI model service of which the instances have been deleted.

* * * * *